United States Patent [19]

Whitehead et al.

[11] 3,927,168

[45] Dec. 16, 1975

[54] OSMIUM RECOVERY FROM GLYCOL SOLUTIONS

[75] Inventors: William F. Whitehead, Lansdowne; Ralph L. Rogers, Norwood, both of Pa.

[73] Assignee: Atlantic Richfield Company, Los Angeles, Calif.

[22] Filed: Dec. 18, 1972

[21] Appl. No.: 316,184

[52] U.S. Cl. .................. 423/22; 260/635; 423/592
[51] Int. Cl. ............................................. C01g 55/00
[58] Field of Search ............................... 423/22, 592

[56] References Cited
UNITED STATES PATENTS

| | | | |
|---|---|---|---|
| 2,049,488 | 8/1936 | Braun | 423/22 |
| 2,610,907 | 9/1952 | Stein et al. | 423/22 |
| 2,773,101 | 12/1956 | Smith et al. | 260/635 H |
| 2,813,130 | 11/1957 | Keeler et al. | 423/22 |
| 3,260,628 | 7/1966 | Logan et al. | 423/265 |
| 3,279,935 | 10/1966 | Daniell et al. | 106/307 |
| 3,317,592 | 5/1967 | Maclean et al. | 260/533 R |
| 3,582,270 | 6/1971 | Harkems | 423/22 |

*Primary Examiner*—Herbert T. Carter
*Attorney, Agent, or Firm*—Delbert E. McCaslin

[57] ABSTRACT

Ozone is passed through the crude oxidation reaction mixture obtained during the osmium catalyzed oxidation of an organic compound, such as an olefin, in order to recover osmium by distillation from the reaction product, for example a glycol, and avoid the formation of insoluble deposits, principally osmium dioxide.

5 Claims, No Drawings

OSMIUM RECOVERY FROM GLYCOL SOLUTIONS

FIELD OF THE INVENTION

The present invention relates to osmium recovery and, more particularly, the present invention relates to the use of ozone for the separation and recovery of osmium from osmium catalyzed reaction mixtures.

BACKGROUND OF THE INVENTION

It has long been known that osmium oxides, particularly the tetroxide ($OsO_4$), are effective catalysts for the oxidation of a great many organic compounds. Osmium tetroxide is especially advantageous for promoting the oxidation of olefins to corresponding glycols. For example, it has been shown that in an aqueous solution maintained at a pH of about 9.5 the osmium tetroxide oxidation of olefins to glycols can be converted from stoichiometric to catalytic by the introduction of oxygen. By operating at superatmospheric pressures, the reaction can be continued until about 5 to 10% by weight of glycol has been formed.

In spite of the advantages of osmium oxides as catalysts, the high cost of osmium compounds, together with the difficulty of avoiding loss of such catalysts during recovery of the reaction product, renders osmium catalyzed processes uneconomical except for small laboratory preparations. In contrast to the tetroxide form, the dioxide form of osmium ($OsO_2$) has low volatility and cannot be distilled effectively even under high vacuum. In crude oxidation reaction mixtures osmium dioxide takes the form of a black precipitate in the reaction vessel which cannot be recovered by distillation. The recovery problem is complicated even further by the fact that osmium oxides can produce serious physiological effects on humans. Accordingly, these oxides must be handled with extreme care and it is important that osmium oxides be removed very completely from any product which is to be sold commercially.

Extensive efforts have been made to discover methods for economically recovering a useful form of osmium from oxidation reaction products. Included among the various proposals which have been advanced for such recovery is the suggestion that osmium oxides first be converted to the non-volatile dioxide form, that the reaction mixture then be distilled to remove volatile organic reaction products, that the osmium dioxide be converted to the volatile tetroxide form by addition of sufficient oxidizing agents (especially peroxides) to the undistilled residue, and that finally osmium tetroxide be recovered by distillation. This procedure, for example, is suggested by U.S. Pat. No. 2,773,101.

Another procedure, suggested in U.S. Pat. No. 2,813,130, is that osmium compounds of the form present in an aqueous organic crude oxidation product mixture be adsorbed on adsorptive alumina. This process is carried out first by contacting the organic mixture from which the osmium compound is to be removed with an adsorptive alumina so as to provide intimate contact with the alumina whereby adsorption of the osmium compound or compounds on the alumina is effected. According to the suggested procedure the alumina is then removed from the mixture and osmium is eventually extracted from the alumina.

It has further been proposed in U.S. Pat. No. 3,317,592 to regenerate spent osmium catalyst values to osmium tetroxide in situ by passing oxygen through an alkaline solution of spent osmium catalyst to effect regeneration simultaneously as the catalyst becomes spent.

The aforementioned proposals show that the importance of osmium recovery has long been recognized. Despite the various procedures which have been suggested, osmium recovery from osmium catalyzed reactions has remained uneconomical except for small laboratory preparations. Reaction products of oxidation contain osmium, presumably in the +6 valence state, complexed with the reaction products and in this state the osmium cannot be distilled.

SUMMARY OF THE INVENTION

An object of the present invention is to provide a commercial method of carrying out oxidation reactions of organic compounds in the presence of an osmium oxide catalyst with minimum loss of the osmium oxide catalyst.

Another object of the present invention is to provide an economically effective method for obtaining the separation of osmium tetroxide from oxidation reaction mixtures obtained using an osmium catalyst, without substantial loss of either catalyst or final reaction product.

Still another object of the present invention is to provide a method for preventing osmium oxides in crude oxidation reaction mixtures from being reduced to osmium dioxide during distillation operations.

Yet another object of the present invention is to provide a practical method for efficiently separating osmium from a glycol mixture.

Still a further object of the present invention is to provide a method for the recovery of osmium catalyst from a crude oxidation reaction mixture in a form suitable for reuse in osmium catalyzed oxidation processes.

These and other objects of the invention will be apparent from the following description of the process in accordance with the present invention in which ozone is passed through the crude reaction mixture obtained during the osmium catalyzed oxidation of an organic compound in order to recover osmium by distillation from the reaction product. The concentration of the ozone in the ozone-air or ozone-oxygen stream passed through the crude oxidation reaction mixture is generally between about 1 and about 12 weight percent and preferably is between about 5 and about 11.5 weight percent. The present invention is particularly applicable to the osmium catalyzed oxidation of olefinic materials to the corresponding glycol.

DESCRIPTION OF THE PREFERRED EMBODIMENTS

The chemistry of osmium is quite complex due to the variety of valence states in which osmium can exist and in spite of extensive work on the subject considerably more remains to be learned of the behavior of osmium compounds under various conditions. Knowledge of the organic chemistry of osmium is especially inadequate. Many coordinate compounds and addition complexes involving osmium in one of its several valence states are known to exist, but the nature of most of these has not been elucidated. The absence of knowledge on osmium coordinate compounds and addition complexes partially explains the heretofore absence of any method of osmium recovery which would permit the economical preparation of chemicals in bulk by osmium catalyzed oxidations.

Examples of organic materials which are particularly suitable for use in osmium catalyzed oxidation reactions include the following: An olefinic hydrocarbon, which can be cyclic or non-cyclic or an olefinic compound having substituents, such as hydroxyl, chlorine, bromine, iodine, fluorine, cyano, carbonyl, carboxyl, carboxylic ester, etc. Specific examples are given below showing the use of typical olefins such as the alpha-olefins including ethylene, propylene, hexadecene-1 and octene-1, internally unsaturated olefins including cyclohexene and cyclo-octene, and olefins containing non-hydrocarbon substituents, such as allyl alcohol. Other olefins are the alpha and internally unsaturated olefins of the formula $C_nH_{2n}$ where $n$ is 2 to 20 or more (e.g. isobutylene, or propylene tetramer) cyclic olefins of the formula $C_m H_{2m}-2$ where $m$ is 3 or more (e.g. cyclopentene); cyclic monolefinic compounds having aromatic substituents such as styrene or diphenylethylene; olefinic compounds having several double bonds, in conjugated (e.g. butadiene or cyclopentadiene) or unconjugated arrangement (e.g. Diels-Alder adducts or maleic acid or its esters with butadiene or other conjugated diolefins); substituted olefinic compounds such as oleic and linoleic acids, methyl oleate and other oleic acid esters, maleic acid, fumaric acid, diethyl or other dialkyl maleiates and fumarates, crotonic acid and its esters, polymeric esters including glycol maleate polyesters, cinnamic acid, acrylonitrile, acrolein, ketene, allene, halogenated olefins such as vinyl chloride or allyl chloride, heterocyclic unsaturated compounds such as 2,4-dimethyl-5,6-dihydropyran; unsaturated alcohols and esters of unsaturated alcohols, such as cinnamyl alcohol and its esters, other polymeric olefinic compounds such as polybutadiene, polyisoprene, etc. The preferred products are polyhydric alcohols having a pair of alcoholic hydroxyl groups on vicinal carbons; thus, from monoolefinic hydrocarbons such as 1-olefins are obtained 1,2-glycols, from allyl alcohol glycerol is obtained, while from polyolefinic compounds there can be obtained polyhydric alcohols having a plurality of pairs of alcoholic hydroxyls.

The amount of osmium oxide, e.g. osmium tetroxide, used for osmium catalyzed oxidation reactions can be very small, e.g., in the range of $10^{-5}$ molar, or less. The preferred concentration is about $1 \times 10^{-4}$ to $10 \times 10^{-4}$ molar, based on the combined liquid volume. Larger amounts of osmium tetroxide ($OsO_4$) can be employed, but such amounts are generally unnecessary and are avoided in order to minimize the loss of this expensive material.

The crude reaction product from the osmium catalyzed oxidation of an organic compound, for example an olefin, usually consists of an aqueous solution (pH 9 to 10) in which osmium, primarily in the +6 valence state, is complexed with the product of the reaction, for example, a glycol. This solution contains osmium in the concentration range generally between 0.01% and 0.2% by weight. For reasons previously mentioned, it is highly desirable to maintain the osmium in a soluble state and to avoid the formation of insoluble deposits which require shutting down the system for cleaning and which require additional osmium recovery operations, with their attendant losses and additional hazards to workers.

Distillation of the crude reaction product solution produces only traces of osmium tetroxide in the aqueous distillate and precipitation of the osmium as the dioxide in the still pot. Passing an oxygen stream through the distilling crude reaction mixture also only produces traces of osmium in the overhead and does not prevent precipitation of osmium dioxide. The presence of the oxygen stream merely delays precipitation.

It has now been discovered that if an ozone or an ozonated stream is passed through the crude reaction product solution as it is distilled the distillate contains almost all of the osmium as the tetroxide and precipitation of osmium dioxide is prevented. Although osmium tetroxide has a boiling point of 130°C., when placed in water its association with like molecules is displaced by association with water molecules and it becomes very much more volatile. Consequently, the first portions distilled can contain a much higher concentration of osmium than the solution being distilled. The highest concentrations of osmium are often found in the small amounts of liquid collected in the dry ice cooled or other traps used to remove the last traces from the exit gas. Distillation of 15 to 20 percent of the crude reaction product solution is usually adequate to accomplish removal of 96 to 99 percent by weight of the osmium.

In accordance with the present invention an ozone containing gas stream, in which ozone is present with another suitable gas or gas mixture, such as oxygen, air and the like, in a concentration of between about 1 and about 12 weight percent of the total gas stream and preferably between about 5 and about 11.5 weight percent, is contacted with an osmium catalyzed oxidation reaction mixture, e.g. by bubbling the ozone containing gas stream through the reaction mixture, while recovering osmium from the reaction mixture by distillation. The temperature at which this is effected is not particularly critical. Normally, the process is carried out at the boiling point of the mixture, although higher and lower temperatures can be employed. In general, temperatures within the range of about −10 degrees C. to the boiling point of the osmium tetroxide can be employed.

Distillation of osmium, as the tetroxide, from solutions containing glycols or other olefin oxidation products by use of ozone in accordance with the present invention shows a typical mass action effect. That is, higher concentrations of ozone provide more effective and complete recovery of the osmium than do lower ozone concentrations. The effectiveness of the distillation is additionally controlled by the stability of the complex formed between the osmium and the glycol or other organic compound. As will be seen in the examples which follow the isobutylene glycol complex with osmium releases osmium, in the presence of ozone, much more readily than does the propylene glycol-osmium complex.

Although higher ozone concentrations are more effective in recovering osmium, they produce more oxidation of the organic materials present. This oxidation produces some alpha hydroxy acid and also lower acids and other products. Thus, the limits of ozone concentration are primarily controlled by economics. The optimum ozone concentration in the air or oxygen stream will generally fall between the limits of about 1 weight percent and about 12 weight percent. However, for each osmium recovery process there will be a different optimum ozone concentration which is determined or limited by such factors as:

1. The response of the particular osmium-organic complex in releasing osmium more readily with increasing ozone concentrations.
2. The relative economic values of the alpha hydroxy acid or other further oxidation products of the glycol or other compound complexed with the osmium.
3. The amount of ozone lost in base catalyzed, non-productive, decomposition of the ozone.
4. The decrease in efficiency of the ozone generator as the ozone concentration rises.

Any suitable distillation method using ordinary, reduced, or superatmospheric pressure, as most convenient, depending upon the nature, particularly the boiling point, of the product which is being recovered, can be used. The fact that distillation can be carried out at sub-atmospheric pressure (in order to minimize the further oxidation of the initial oxidation product) does not require that treatment with ozone must also be done at sub-atmospheric pressure, since these two steps can be carried out in separate enclosures. Distillation with steam or other gases can be used. Fractional distillaton can advantageously be employed to take off product, by-product, solvent and other components of the reaction mixture separately in addition to osmium oxide. Extractive distillation with a suitable solvent or solvents for one or more of the components can also be used, if desired, to aid in the separation of the product from the osmium oxide catalyzed reaction.

It will be understood that the method of recovery disclosed herein can be used in connection with either batch or continuous operations. The present invention advantageously permits osmium oxide catalysts to be recovered from the original reaction vessel thereby eliminating the necessity for multiple handling stages in the recovery of the osmium catalyst which only tend to increase the cost of recovery and lower the overall efficiency of the recovery procedure.

The invention is further illustrated by, but not limited to, the following examples. It will be understood that Example I is a comparative example which illustrates the percentage of osmium which can be recovered by distillation from a basic aqueous osmium tetroxide solution. Example II is another comparative example illustrating the effect of the presence of a glycol on the attempted recovery of osmium by distillation from an osmium tetroxide solution. Example III is a still further comparative example in which oxygen is introduced into an osmium tetroxide-glycol solution during distillation. Examples VI and VIII illustrate that the presence of even very small amounts of ozone introduced during distillation into a crude oxidation reaction mixture obtained during the osmium catalyzed oxidation of an organic compound has a decided effect on the recovery of osmium.

EXAMPLE I

The pH of 100 milliliters of aqueous osmium tetroxide solution containing 59 milligrams of osmium was adjusted to 11.3 by addition of sodium hydroxide. The resulting mixture was then distilled at atmospheric pressure using a 10 centimeter vigereaux column. The distillate was collected in 10 milliliter fractions and analyzed by X-ray fluorescence. The following table sets forth the percentage of original osmium recovered during each fraction:

| Fraction Number | Fraction Weight in Grams | Percent by Weight of Original Osmium |
|---|---|---|
| 1 | 10 | 80 ± 5 |
| 2 | 10 | 5.9 ± 0.2 |
| 3 | 10 | 1.4 ± 0.1 |
| 4 | 10 | 0.7 ± 0.1 |
| 5 | 10 | 0.3 ± 0.1 |
| 6 | 10 | 0 ± 0.1 |
| 7 | 10 | 0 ± 0.1 |
| 8 | 10 | 0 ± 0.1 |
| Bottoms | 19 | 9.1 ± 0.2 |
| Total | 99 | 97 ± 5 |

The remainder in the distillation pot was black due to precipitation of osmium dioxide. Filtration of the bottoms yielded a clear brown solution containing 1.2 ± 0.1 percent by weight of the original osmium. Thus, 7.9 ± 0.2 percent by weight of the original osmium was reduced to osmium dioxide.

EXAMPLE II

A mixture was prepared composed of 103.4 grams of aqueous osmium tetroxide solution containing 50 milligrams of osmium and 8.9 grams of isobutylene glycol buffered to a pH of 9.5 by the addition of 3.2 grams of sodium bicarbonate and 2.6 grams of sodium carbonate. The mixture was distilled at atmospheric pressure using a 10 centimeter vigereaux column. Only one distillate sample of 18.6 grams was removed, as indicated by the values set forth below:

| Fraction Number | Fraction Weight in Grams | Percent by Weight of Orginal Osmium |
|---|---|---|
| 1 | 18.6 | 0.7 ± 0.2 |
| Bottoms | 83.4 | 95.5 ± 2.5 |
| Total | 102.0 | 96.2 ± 2.5 |

At the onset of boiling the contents of the distillation still pot turned dark brown and then black. Thus, unlike the simple distillation of aqueous solution of osmium tetroxide in Example I the presence of glycol in the present example renders it impossible to effect the separation and recovery of the osmium content of the osmium tetroxide solution under the specified conditions.

EXAMPLE III

A still pot was charged with 109.5 grams of a mixture prepared by adding 100 cubic centimeters of osmium tetroxide solution containing 716 parts per million of osmium, 10 grams of isobutylene glycol and 5 grams of pyridine. A 5 gram sample of the mixture removed for analysis revealed 580 ± 10 parts per million of osmium.

The charge to the still pot was distilled at atmospheric pressure using a 10 centimeter vigereaux column while bubbling an oxygen stream through the still pot at a rate of 100 to 200 cubic centimeters per minute. Distillate was collected in 10 to 12 milliliter fractions and analyzed for osmium. Uncondensed gases were passed through a dry ice cooled trap, which condensed 0.3 grams of additional distillate. The trap condensate was diluted to 20 cubic centimeters for analysis. The contents of the still pot turned dark slowly about 45 minutes after the onset of boiling and about the end of the collection of fraction 2. The results are set forth in the following table:

| Fraction Number | Fraction Weight in Grams | Percent by Weight of Original Osmium |
|---|---|---|
| Trap | 0.3 | 0 ± 0.2 |
| 1 | 11.5 | 0 ± 0.1 |
| 2 | 10.9 | 0 ± 0.1 |
| 3 | 9.9 | 0 ± 0.1 |
| 4 | 11.8 | 0 ± 0.1 |
| Bottoms | 63.8 | 100 ± 4 |
| | Total 108.2 | 100 ± 4 |

Comparison of Examples II and III show that the introduction of oxygen into the still pot had essentially no effect on the percentage of original osmium recovered by distillation.

EXAMPLE IV

A mixture of 100 cubic centimeters of osmium tetroxide solution containing 716 parts per million of osmium, 9.31 grams of isobutylene glycol, 3.6 grams of sodium bicarbonate and 2.9 grams of sodium carbonate was prepared. A 9 gram sample removed for analysis revealed that it contained 650 parts per million of osmium. A still pot was then charged with 106.4 grams of the mixture.

The charge to the still pot was distilled at atmospheric pressure through a 10 centimeter vigereaux column while an ozone stream was bubbled through the still pot. Analysis of the ozone stream established that the stream contained 11 percent by weight of ozone and 89 percent by weight of oxygen.

Distillate was collected in 10 milliliter fractions and analyzed for osmium. Uncondensed gases were passed through a dry ice cooled trap which condensed 0.35 grams of additional distillate. This trap condensate was diluted to 15 cubic centimeters for analysis. Total distillation time was 100 minutes. The results of the distillation are set forth in the following table:

| Fraction Number | Fraction Weight in Grams | Percent by Weight of Original Osmium |
|---|---|---|
| Trap | 0.4 | 6 ± 0.3 |
| 1 | 9.2 | 15 ± 0.7 |
| 2 | 9.6 | 13 ± 0.5 |
| 3 | 11.4 | 15 ± 0.5 |
| Bottoms | 73.8 | 19 ± 1.1 |
| | Total 104.4 | 68 ± 1.5 |

The bottoms were light brown at the end of the distillation. Osmium losses were probably due to volatilization of osmium tetroxide from the distillate fractions.

EXAMPLE V

A still pot was charged with the reaction mixture consisting of the oxidation product obtained during the oxidation of isobutylene to corresponding glycol in the presence of oxygen using osmium tetroxide catalyst and aqueous rinsings. The charge to the still pot weighed 126.6 grams and contained 2.90 percent by weight of isobutylene glycol and 300±10 parts per million of osmium.

Initially, an oxygen stream of 200 to 500 cubic centimeters per minute was bubbled through the still pot while the charge described above was distilled at atmospheric pressure through a 10 centimeter vigereaux column. After collecting the first three 8 cubic centimeter fractions of condensate an ozonizer was activated and an ozone-oxygen stream was bubbled through the still pot while four additional 9 cubic centimeter distillation fractions were collected. The ozone content of the ozone-oxygen stream introduced into the still pot was about 10 percent by weight.

Each condensate receiver was precharged with 1.0 gram of 50 percent by weight aqueous isobutylene glycol and cooled in a dry ice bath during use. Uncondensed gases were passed through a dry ice cooled trap which condensed an additional 0.24 gram of distillate. The trap was precharged with 5.4 grams of 50 percent by weight aqueous isobutylene glycol. The total distillation time was 91 minutes. Results of the distillation are set forth in the following table:

| Fraction Number | Fraction Weight in Grams | Percent by Weight of Original Osmium |
|---|---|---|
| 1 | 7.7 | 0.4 ± 0.1 |
| 2 | 9.3 | 0.4 ± 0.1 |
| 3 | 8.1 | 0.3 ± 0.1 |
| Trap | 0.24 | 11.2 ± 0.4 |
| 4 | 8.5 | 62. ± 4 |
| 5 | 9.1 | 27. ± 1 |
| 6 | 8.8 | 1.4 ± 0.2 |
| 7 | 11.0 | 0.4 ± 0.2 |
| Bottoms | 62.1 | 1.2 ± 0.8 |
| | Total 124.8 | 104 ± 4 |

The bottoms contained 0.42 percent by weight of alphahydroxy isobutyric acid, an increase over the original 0.12 percent by weight. This accounts for 2 percent of the original glycol. An additional 50 percent by weight of the glycol disappeared, presumably by oxidation to lower molecular weight acids.

EXAMPLE VI

A mixture was prepared by adding 10 grams of isobutylene glycol, 3.6 grams of sodium bicarbonate and 2.9 grams of sodium carbonate to 100 cubic centimeters of osmium tetroxide solution containing about 750 parts per million of osmium. The mixture contained 790 ± 15 parts per million of osmium by analysis. 103.3 grams of the mixture was charged to a still pot equipped with a 10 centimeter vigereaux column. Using an ozonized oxygen stream of 2.7 weight percent ozone bubbling through the still pot at about 45 cubic centimeters per minute, the charge was distilled at atmospheric pressure.

Condensate fractions were obtained and each condensate receiver was precharged with 1.0 gram of 50 percent aqueous propylene glycol solution cooled in a dry ice bath during use. Exit gases from the distillation were passed through a dry ice trap containing 15.5 grams of 50 percent by weight aqueous propylene glycol solution to recover the last of the osmium. Distillation time was 112 minutes. The results of the distillation are set forth in the following table:

| Fraction Number | Fraction Weight in Grams | Percent by Weight of Original Osmium |
|---|---|---|
| Trap | 0.25 | 5.1 ± 1 |
| 1 | 8.3 | 2.7 ± 0.1 |
| 2 | 8.8 | 2.3 ± 0.1 |
| 3 | 9.3 | 2.3 ± 0.1 |
| 4 | 9.6 | 2.1 ± 0.1 |
| 5 | 8.9 | 2.1 ± 0.1 |
| 6 | 9.8 | 1.0 ± 0.1 |
| Bottoms | 46.0 | 87.4 ± 5 |
| | Total 100.95 | 105.0 ± 5 |

The bottoms contained greater than 73 percent by weight of the original glycol unchanged and alphahydroxy isobutyric acid amounting to 1 percent by weight of the original glycol.

EXAMPLE VII

A mixture was prepared by adding 10.0 grams of propylene glycol, 3.6 grams of sodium bicarbonate and 2.9 grams of sodium carbonate to 100 cubic centimeters of osmium tetroxide solution containing about 750 parts per million of osmium. This mixture contained 860 ± 20 parts per million of osmium by analysis. A still pot was charged with 96.5 grams of the solution.

Using an ozonized oxygen stream bubbling through the still pot at a rate of 200 cubic centimeters per minute the charge described above was distilled at atmospheric pressure through a 10 centimeter vigereaux column. At the indicated flow rate of the ozonized oxygen stream, the amount of ozone present in the oxygen stream was determined to be 11 weight percent.

Several fractions were obtained during distillation. Each condensate receiver was precharged with 1.0 gram of 50 percent aqueous propylene glycol solution and cooled in a dry ice bath during use. Exit gases from the distillation were passed through a gas scrubber containing 14 percent ethanol and 0.1 N sodium hydroxide to recover the last of the osmium. Distillation time was 79 minutes. Results of the distillation are set forth in the following table:

| Fraction Number | Fraction Weight in Grams | Percent by Weight of Original Osmium |
|---|---|---|
| Trap | About 0.5 | 27 ± 2 |
| 1 | 8.5 | 18 ± 2 |
| 2 | 8.7 | 6 ± 0.1 |
| 3 | 8.5 | 7 ± 0.1 |
| 4 | 7.7 | 3 ± 0.1 |
| Bottoms | 60.1 | 39 ± 1 |
| | Total 94.0 | 100 ± 3 |

The bottoms contained 76 mole percent of the original glycol, 21 mole percent as formic acid and 3 mole percent as lactic acid.

EXAMPLE VIII

A still pot was charged with 88.7 grams of 10% propylene glycol in water containing 810 parts per million of osmium and then buffered to a 9½ pH with sodium bicarbonate and sodium carbonate. The resulting mixture substantially simulates the reaction product of the oxidation of propylene using an osmium catalyst.

An ozonized oxygen stream of 2.7 weight percent ozone was bubbled through the still pot at about 40 cubic centimeters per minute as the charge to the still pot was distilled at atmospheric pressure through a 10 centimeter vigereaux column. Fractions were taken during the distillation. Each condensate receiver was precharged with 1.0 gram of aqueous propylene gylcol solution and cooled in a dry ice bath during use. Exit gases from the distillation were passed through a gas scrubber containing 14 percent ethanol and 0.1 N sodium hydroxide in order to recover the last of the osmium. Total distillation time was 103 minutes. Results of the distillation are set forth in the following table:

| Fraction Number | Fraction Weight in Grams | Percent by Weight of Original Osmium |
|---|---|---|
| Trap | About 0.28 | 12 ± 0.5 |
| 1 | 8 | 5 ± 0.1 |
| 2 | 8.6 | 3 ± 0.5 |
| 3 | 8.4 | 3 ± 0.05 |
| 4 | 9.9 | 2 ± 0.07 |
| Bottoms | 51.4 | 75 ± 2 |
| | Total 86.5 | 100 ± 2 |

The bottoms contained 97 mole percent of the original glycol, 1 mole percent as formic acid and 2 mole percent as lactic acid.

EXAMPLE IX

A mixture was prepared by adding 9.9 grams of isobutylene glycol, 3.94 grams of monosodium dihydrogen phosphate monohydrate and 2.56 grams of disodium hydrogen phosphate to 100 cubic centimeters of osmium tetroxide solution containing about 750 parts per million of osmium. The mixture had a pH of 6.5 and contained 630 parts per million of osmium by analysis. A still pot was charged with 99.28 grams of this mixture.

An ozonized oxygen stream having 2.7 weight percent ozone was bubbled through the still pot at about 45 cubic centimeters per minute while the charge was distilled at atmospheric pressure through a 10 centimeter vigereaux column. After 4 fractions had been taken overhead, the ozone concentration was raised to about 11 percent by weight.

Each condensate receiver was precharged with 1.0 gram of 50 percent aqueous propylene glycol solution and cooled in a dry ice bath during use. Exit gases from the distillation were passed through a dry ice bath cooled trap containing 7.4 grams of 50 percent aqueous propylene glycol solution. Distillation was completed in 91 minutes. Results of the distillation are set forth in the following table:

| Fraction Number | Fraction Weight in Grams | Percent by Weight of Original Osmium |
|---|---|---|
| Trap | 0.1 | 14 ± 2 |
| 1 | 8.6 | 56 ± 5 |
| 2 | 7.9 | 5 ± 0.3 |
| 3 | 9.0 | 6 ± 0.3 |
| 4 | 9.1 | 6 ± 0.3 |
| 5 | 8.2 | 8 ± 0.3 |
| 6 | 8.5 | 4 ± 0.3 |
| Bottoms | 47.2 | 1 ± 1 |
| | Total 98.6 | 100 ± 5 |

This example demonstrates the effect of pH and ozone concentration on osmium in the condensate. It can be seen that low concentrations of ozone are more effective in releasing osmium tetroxide from a complex with glycol in an acidic (pH 6.5) solution than, for example, in a basic (pH 9.5) solution.

It will be understood that the principles of the invention illustrated by the foregoing examples can be applied in many other reactions. The process is equally successful in the recovery of osmium tetroxide used as a catalyst for the hydroxylation of olefinic aldehydes where it can be used to separate osmium oxide from the hydroxylation product. Other types of osmium tetroxide catalyzed reactions in which the method of recovering the catalyst can be successfully used are, for example, the conversion of vinyl esters or others, such as vinyl acetate or divinyl ether, to glycol aldehyde and other reactions. The oxidation of olefins to ketones or aldehydes, for instance, the reaction of propylene tetramer with hydrogen peroxide in tertiary butyl alcohol solution at 50°C. in the presence of osmium tetroxide catalyst, is another example of a process in which the present method is useful. For other examples, reference is made to H. Gilman's "Organic Chemistry, An Advanced Treatise," Volume IV, Chapter 12 (J. Wiley & Sons, New York, N.Y. 1953), especially pages 1180–1184.

From the foregoing it will be seen that this invention is well adapted to obtain all of the ends and objects hereinabove set forth, together with other advantages which are obvious and which are inherent to the system.

Since the present invention eliminates the need for reduction of the osmium to the dioxide form, the invention eliminates osmium losses and the cleaning problems inevitably caused by precipitation and deposition of osmium dioxide particles.

The invention also has the advantage of not requiring the distillation of large amounts of water or other solvent before recovery of the osmium. This means that the crude oxidation reaction product can be stripped of its osmium and sent to the next step of a chemical process without the need for an additional separation.

A further advantage is provided when it does become necessary or desirable to separate water or another solvent, since the distillation of water or other solvent can be accomplished from a solution essentially free of osmium. A distilled product can accordingly be obtained in which any osmium contamination is reduced to below the level of detectability.

The method of the present invention also provides a reduction in the number of distillation and/or other concentration steps required, especially compared to the previously proposed method involving adsorption on adsorption alumina.

Obviously, many modifications and variations of the invention as hereinbelow set forth can be made without departing from the spirit and scope thereof.

What is claimed is:

1. The method of separating osmium from an organic oxidation reaction mixture containing a polyhydric alcohol and obtained by the osmium catalyzed oxidation of an olefin which method comprises contacting the oxidation reaction mixture with an ozone containing gas which contains between about 1 and about 12 per cent by weight of ozone said ozone containing gas being a mixture of ozone and oxygen or a mixture of ozone and air and distilling the oxidation reaction mixture to recover osmium present in that mixture.

2. The method of claim 1 in which the ozone containing gas contains between about 5 and about 11.5 per cent by weight of ozone.

3. The method of claim 1 wherein the ozone containing gas is contacted with the reaction mixture by bubbling the ozone containing gas through the reaction mixture.

4. The method of claim 1 wherein said polyhydric alcohol is a 1,2 glycol.

5. The method of claim 1 wherein said polyhydric alcohol is selected from the group consisting of propylene glycol and isobutylene glycol.

* * * * *